United States Patent
Ko et al.

(10) Patent No.: US 6,777,493 B2
(45) Date of Patent: Aug. 17, 2004

(54) END-MODIFIED STYRENE-DIENE BLOCK COPOLYMER PREPARED USING POLYFUNCTIONAL COUPLING AGENT

(75) Inventors: Young Hoon Ko, Daejeon (KR); Sun Woo Cheen, Daejeon (KR)

(73) Assignee: Korea Kumho Petro Chemical Co., Ltd., Seoul (KR)

( * ) Notice: Subject to any disclaimer, the term of this patent is extended or adjusted under 35 U.S.C. 154(b) by 0 days.

(21) Appl. No.: 10/283,160

(22) Filed: Oct. 30, 2002

(65) Prior Publication Data

US 2004/0044133 A1 Mar. 4, 2004

(30) Foreign Application Priority Data

Sep. 2, 2002 (KR) .................. 10-2002-0052541

(51) Int. Cl.[7] .................. C08L 83/04; C08L 53/02; C08G 77/20; C08G 77/42; C08K 5/54
(52) U.S. Cl. .................. 525/100; 525/98; 525/316; 525/431; 525/446; 525/474; 525/326.5; 528/42; 524/731; 524/862
(58) Field of Search .................. 525/100, 98, 316, 525/431, 446, 474, 326.5, 271; 528/42; 524/731, 862

(56) References Cited

U.S. PATENT DOCUMENTS

| | | | |
|---|---|---|---|
| 5,194,500 A | 3/1993 | Chin et al. | 525/97 |
| 5,292,819 A | 3/1994 | Diehl et al. | 525/314 |
| 5,399,627 A | 3/1995 | Diehl et al. | 525/314 |
| 5,627,234 A | 5/1997 | Giordano et al. | 525/89 |
| 5,668,208 A | 9/1997 | Viola et al. | 524/505 |
| 6,566,480 B2 * | 5/2003 | Ko et al. | 528/42 |

FOREIGN PATENT DOCUMENTS

JP 10316800 A * 12/1998 .......... C08L/15/00

* cited by examiner

*Primary Examiner*—James J. Seidleck
*Assistant Examiner*—Olga Asinovsky
(74) *Attorney, Agent, or Firm*—Bacon & Thomas, PLLC

(57) ABSTRACT

A radial end-modified styrene-conjugated diene block copolymer having a general formula 1. The copolymer is obtained by synthesizing a styrene-conjugated diene block copolymer by way of copolymerization using an organic lithium initiator in the presence of a nonpolar solvent and then coupling the anionic active end of the resulting copolymer with a polyfunctional polysiloxane:

$$(PS-PD)_3Si-CH_2CH_2-[SiO(CH_3)_2-]_nSi(CH_3)_2R \quad \text{Formula 1}$$

wherein, PS is polystyrene, PD is polydiene such as polyisoprene or polyisoprene-polybutadiene, R is hydroxy group or -(PD-PS), and n is an integer of 1 to 100. The block copolymer based adhesives have low melt viscosity and excellent adhesive strength.

15 Claims, No Drawings

END-MODIFIED STYRENE-DIENE BLOCK COPOLYMER PREPARED USING POLYFUNCTIONAL COUPLING AGENT

BACKGROUND OF THE INVENTION

1. Field of the Invention

The present invention relates to an end-modified styrene-diene block copolymer for use in hot-melt adhesives having new microstructures. More particularly, the present invention relates to an end-modified styrene-diene block copolymer made by reacting an end of styrene-diene copolymer with a polyfunctional polysiloxane as a new coupling agent.

2. Description of the Related Art

According to known documents, a styrene-diene block copolymer for use in hot-melt adhesives can be obtained in the form of linear PS-PD-PS block copolymer or radial $(PS\text{-}PI)_nX$ or $(PS\text{-}PI\text{-}PB)_nX$ by copolymerizing alkenyl arene and diene using an alkyl lithium as an initiator and then reacting the obtained copolymer with a bifunctional, trifunctional or tetrafunctional coupling agent. In this case, PS is a polymer block of an alkenyl arene, PD is a polymer block of a diene, PI is a polymer block of an isoprene, PB is a polymer block of a butadiene, X is a residue of a polyfunctional coupling agent after the coupling reaction, and n is 3 or 4.

U.S. Pat. No. 5,194,500 discloses a styrene-isoprene block copolymer having a general structure of $(PS\text{-}PI)_3X$ made using a trifunctional coupling agent for use in hot melt adhesives to thereby ensure improved physical properties of the adhesives. U.S. Pat. Nos. 5,292,819 and 5,399,627 disclose advantages of hot-melt adhesives based on $(PS\text{-}PI\text{-}PB)_nX$ block copolymers. U.S. Pat. No. 5,627,234 discloses the use of the resulting mixture obtained by reacting an alkenyl arene compound and a diene compound with various types of coupling agents in the composition of adhesives. U.S. Pat. No. 5,668,208 discloses that $(PS\text{-}PI)_3(OR)_nOH$ copolymer based hot-melt adhesives have superior adhesive property to conventional hot-melt adhesives based on $(PS\text{-}PI)_3X$ copolymer having three arms. However, there is still a need to improve adhesive strength of adhesives commonly used for industrial purposes. In particular, because most adhesive sites are polar, with regard to conventional styrene-diene block copolymer based adhesives, improvement of adhesive strength on polar surfaces is required.

SUMMARY OF THE INVENTION

Therefore, the present invention has been made in view of the above problems, and it is an object of the present invention to provide an end-modified polymer with low melt viscosity and excellent adhesive strength by use of a polyfunctional polysiloxane as a coupling agent.

In accordance with the present invention, the above object and other objects can be accomplished by the provision of a radial styrene-diene block copolymer having a general formula 1, made by copolymerizing styrene and diene using an organic lithium initiator in the presence of an organic solvent which does not react with the organic lithium and then end-modifying the resulting copolymer using a polysiloxane compound as a coupling agent:

  Formula 1 wherein,

PS is polystyrene, PD is polydiene such as polyisoprene or polyisoprene-polybutadiene, R is hydroxy group or -(PD-PS), and n is an integer of 1 to 100.

DESCRIPTION OF THE PREFERRED EMBODIMENTS

Hereinafter, the present invention will be described in more detail.

A radial end-modified styrene-diene block copolymer having a general formula 1 is obtained by synthesizing styrenediene block copolymer by an anionic copolymerization using an organic lithium initiator in the presence of an organic solvent that does not react with the organic lithium, and then coupling the anionic active end of the resulting copolymer with a polyfunctional polysiloxane:

  Formula 1 wherein,

PS is polystyrene, PD is polydiene such as polyisoprene or polyisoprene-polybutadiene, R is hydroxy group or -(PD-PS), and n is an integer of 1 to 100.

A number average molecular weight of the polystyrene (PS) in the formula 1 is 5,000 to 20,000, and preferably 8,000 to 15,000. A number average molecular weight of the polydiene (PD) is 40,000 to 150,000, and preferably 50,000 to 130,000. The weight ratio of polyisoprene/polydiene is 50% or more by weight, preferably 90% or more by weight. A number average molecular weight of the end-modified polymer of the formula 1 is 200,000 to 500,000, and preferably 250,000 to 400,000. The total content of the polystyrene block is at least 10 to 30% by weight, preferably 17 to 25% by weight of the polymer of the present invention. The polymer of the present invention is a radial polymer having three to four polystyrene-polydiene diblocks. The end of the polymer that reacts with a polyfunctional polysiloxane coupling agent is isoprene or butadiene. If the polydiene is polyisoprene-polybutadiene, the weight ratio of polyisoprene/polydiene is 50% or more by weight, and preferably 90% or more by weight. The coupling agent which is used herein is a α,ω-bis(2-trichlorosilylethyl) polydimethylsiloxane and was prepared according to the method disclosed in Korean Patent No. 0332466. An anionic polymerization is used in the present invention. Added alkenyl arenes and dienes are subsequently polymerized using an organic lithium compound in the presence of a suitable organic solvent that does not react with anions. Hydrocarbon compounds are used as the organic solvents herein and are solvents that do not react with anions. They are selected from the group consisting of linear hydrocarbon compounds such as pentane, hexane, heptane and octane; branched derivatives thereof; cyclic hydrocarbon compounds such as cyclohexane and cycloheptane; aromatic hydrocarbon compounds such as benzene, toluene and xylene; linear or cyclic ether compounds such as dimethyl ether, diethyl ether, anisole and tetrahydrofuran. The organic lithium compound used in the anionic polymerization is n-butyl lithium, s-butyl lithium or t-butyl lithium. A temperature for the anionic polymerization is generally within the range of from 20° C. to 100° C., and a reaction pressure is generally within the range of from atmospheric pressure to 5 kgf/cm². An end-modified polymer obtained by reaction of anionic active site of an end of polymer and polyfunctional coupling agent has a coupling efficiency that can be calculated as follows:

(Coupled polymer area)/(Total polymer area)×100

The coupling efficiency can be calculated as an area of polymer peak measured by gel permeation chromatography (GPC). The coupling number (CN) can also be calculated by GPC as follows:

(Coupled polymer peak molecular weight after coupling/ Polymer peak molecular weight before coupling).

Typically, a satisfactory value of the coupling efficiency is within the range of from 60% to 95%, and preferably from 75% to 90%. If the coupling efficiency is less than 60%, physical properties of adhesives are undesirably lowered, while if it exceeds 95%, a melt viscosity is increased and thus workability is not easily obtained. It is also difficult to obtain coupling efficiency of more than 95%. The adhesive composition of the present invention comprises a plasticizer oil, a tackifier, an antioxidant and the like. The plasticizer oil to be used herein is a paraffin oil or a naphthenic oil. The tackifier is present in liquid phase at room temperature and includes C5 resin or C9 resin. The antioxidant is also used as an additive herein and includes a steric hindered phenolic compound with high molecular weight, phosphorus- or sulfur-containing phenol, and the like. For example, pentaerythritol-tetrakis-3-(3,5-di-t-butyl-4-hydroxyphenyl) propionate; 4,4'-methylenebis(4-methyl-6-t-butylphenol); di-n-octadecyl-3,5-di-t-butyl-4-hydroxybenzophophonate; and the like may be used.

EXAMPLES

The invention will be described with reference to, but is not limited to, the following examples.

Example 1

Preparation of End-Modified Styrene-Isoprene Block Copolymer

A 10 L stainless steel polymerization reactor was washed, dried and refluxed with dry nitrogen. Then, 156 g of styrene, 4,800 g of cyclohexane and 8.3 Ml of n-butyl lithium (2.0M solution in cyclohexane) were charged into the reactor. Polymerization was initiated at 40° C. and the mixture was stirred for 30 minutes. Then, 644 g of isoprene was added and polymerization was allowed to proceed for 30 minutes. After that time period, 2.0 g $\alpha,\omega$-bis(2-trichlorosilylethyl)polydimethylsiloxane (a number average molecular weight: about 1,345 g/mol) was added and the coupling reaction was allowed to proceed for 30 minutes. Then, 1 g trimethylsilylchloride [$(CH_3)_3SiCl$] was added, the reaction mixture was stirred for 10 minutes and then the reaction was terminated. A polymer thus obtained was dried at 60° C. under reduced pressure for 24 hours to obtain a radial end-modified styrene/isoprene block copolymer.

The content of styrene and the content of vinyl of isoprene in an obtained rubber, measured by $^1$H-NHR, were 19.5% by weight and 8% by weight respectively. The analysis by GPC indicated that a number average molecular weight (Mn) before coupling was 105,950; a number average molecular weight after coupling was 348,910; CE was 78%; and CN was 3.3.

Example 2

Preparation of End-Modified Styrene-Isoprene-Butadiene Block Copolymer

A 10 L stainless steel polymerization reactor was washed, dried and refluxed with dry nitrogen. Then, 156 g of styrene, 4,800 g of cyclohexane and 8.3 Ml of n-butyl lithium (2M solution in cyclohexane) were charged into the reactor. Polymerization was initiated at 40° C. and the mixture was stirred for 30 minutes. Then, 634 g of isoprene was added and polymerization was allowed to proceed for 30 minutes. After that time period, 10 g of butadiene was added thereby to give a polymer with butadiene as an anionic active end. Then, 2.0 g $\alpha,\omega$-bis(2-trichlorosilylethyl) polydimethylsiloxane (a number average molecular weight: about 1,345 g/mol) was added and the coupling reaction was allowed to proceed for 30 minutes. Then, 1 g trimethylsilylchloride [$(CH_3)_3SiCl$] as a reaction terminator was added, the reaction mixture was stirred for 10 minutes and then reaction was terminated. A polymer thus obtained was dried at 60° C. under reduced pressure for 24 hours to obtain a radial end-modified styrene-isoprene-butadiene block copolymer.

The content of styrene and the content of vinyl of isoprene in an obtained rubber, measured by $^1$H-NHR, were 19.5% by weight and 8% by weight respectively. The analysis by GPC indicated that a number average molecular weight (Mn) before coupling was 103,500; a number average molecular weight after coupling was 362,050; CE was 78%; and CN was 3.5.

Comparative Example 1

Preparation of Styrene-Isoprene Block Copolymer

A 10 L stainless steel polymerization reactor was washed, dried and refluxed with dry nitrogen. Then, 156 g of styrene, 4,800 g of cyclohexane and 8.3 Ml of n-butyl lithium (2M solution in cyclohexane) were charged into the reactor. Polymerization was initiated at 40° C. and the mixture was stirred for 30 minutes. Then, 644 g of isoprene was added and polymerization was allowed to proceed for 30 minutes thereby to give a polymer with isoprene as an active end. After that time period, 0.7 g phenyl trichloro silane ($PhSiCl_3$) as a coupling agent was added and the coupling reaction was allowed to proceed for 30 minutes. Then, 1 g trimethylsilylchloride [$(CH_3)_3SiCl$] was added, the reaction mixture was stirred for 10 minutes and then reaction was terminated. A polymer thus obtained was dried at 60° C. under reduced pressure for 24 hours to obtain a radial styrene-isoprene block copolymer coupled with silicone tetrachloride. The content of styrene and the content of vinyl of isoprene in an obtained rubber, measured by $^1$H-NHR, were 19.5% by weight and 8% by weight respectively. The analysis by GPC indicated that a number average molecular weight (Mn) before coupling was 97,985; a number average molecular weight after coupling was 283,700; CE was 79%; and CN was 2.9.

Comparative Example 2

Preparation of Styrene-Isoprene-Styrene Block Copolymer

A 10 L stainless steel polymerization reactor was washed, dried and refluxed with dry nitrogen. Then, 78 g of styrene, 4,800 g of cyclohexane and 6 Ml of n-butyl lithium (2M solution in cyclohexane) were charged into the reactor. Polymerization was initiated at 40° C. and the mixture was stirred for 30 minutes. Then, 644 g of isoprene was added and polymerization was allowed to proceed for 30 minutes. 78 g of styrene was again added and continuous polymerization was allowed to proceed for 30 minutes thereby to give a linear styrene-isoprene-styrene polymer. 1 g trimethylsilylchloride (($CH_3)_3SiCl$) was added, the reaction mixture was stirred for 10 minutes and then reaction was terminated. A polymer thus obtained was dried at 60° C. under reduced pressure for 24 hours to obtain a linear styrene-isoprene-styrene block copolymer. The content of styrene and the content of vinyl of isoprene in an obtained rubber, measured by $^1$H-NHR, were 19.5% by weight and 8% by weight respectively. The analysis by GPC indicated that the polymer had a number average molecular weight (Mn) of 141,450.

Formulation: Compositions and Physical Properties of Hot-Melt Adhesives

By using the samples obtained in the examples 1 and 2, and comparative examples 1 and 2, respective adhesives were prepared. The adhesive composition is presented in Table 1. A Z-Blade type blender was used to blend components in respective compositions at 150° C. for 1 hours.

TABLE 1

| Composition | Content (g) |
|---|---|
| Polymer | 100 |
| Tackifier (Wingtack 86)[1] | 140 |
| Plasticizer (White oil 2150)[2] | 40 |
| Antioxidant (Irganox 1010) | 2 |

[1]Goodyear, softening point 86° C.
[2]Michang Co., Korea

The physical properties of the resulting adhesives were measured according to the following methods and the results are presented in Table 2.

1) Melt Viscosity (cps): Brookfield viscosity at 180° C. (spindle #31)
2) Softening Point: ASTM E 28, 5° C./min.
3) Ball Tack: PSTC 1 at 23° C.
4) Loop Tack: ASTM D 6195 at 23° C.
5) Peel Strength: ASTM D 903.
6) Holding Power: PSTC 7, to steel, 0.5×0.5 inch, 1 kg load, at 49° C.

TABLE 2

| Test items | Example 1 | Example 2 | Comparative example 1 | Comparative example 2 |
|---|---|---|---|---|
| Melt viscosity (cps) | 45,300 | 46,000 | 36,200 | 52,800 |
| Softening point (° C.) | 124 | 125 | 120 | 116 |
| Ball Tack (cm) | 14 | 15 | 13 | 15 |
| Loop Tack (gf/in) | 1,700 | 1,710 | 1,730 | 1,730 |
| Peel Strength (gf/in) | 1,190 | 1,200 | 1,160 | 1,200 |
| Holding Power (min) | 2,100 | 2,150 | 1,000 | 23 |

The examples 1 and 2 according to the present invention had adhesive strengths of 2,100 or more minutes even under relatively low viscosity of 45,000 to 46,000 cps, whilst the comparative examples 1 and 2 were very poor in adhesive strength.

As apparent from the above, the present invention provides a radial end-modified styrene-diene block copolymer obtained by coupling an end of styrene-diene block copolymer made in the presence of an organic lithium catalyst with α,ω-bis(2-trichlorosilylethyl)polydimethylsiloxane as a polyfunctional coupling agent. Such polymer based adhesives have improved adhesive strengths on adhesive sites.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A radial styrene-diene block copolymer having a formula 1, made by copolymerizing styrene and diene using an organic lithium initiator in the presence of an organic solvent which does not react with the organic lithium and then end-modifying the resulting copolymer using α,ω-bis(2-trichlorosilylethyl)polydimethylsiloxane as a coupling agent:
wherein

wherein,
PS is polystyrene, PD is polydiene such as polyisoprene or polyisoprene-polybutadiene, R is hydroxy group or -(PD-PS), and n is an integer of 1 to 100.

2. The styrene-diene block copolymer as set forth in claim 1, wherein the organic lithium initiator is one or more selected from the group consisting of n-butyl lithium, s-butyl lithium and t-butyl lithium.

3. The styrene-diene block copolymer as set forth in claim 1, wherein the PD is polyisoprene or polyisoprene-polybutadiene, and polyisoprene/polydiene is 50% or more by weight.

4. The styrene-diene block copolymer as set forth in claim 1, wherein the PD is polyisoprene or polyisoprene-polybutadiene, and polyisoprene/polydiene is 90% or more by weight.

5. The styrene-diene block copolymer as set forth in claim 1, wherein a number average molecular weight of the styrene-diene block copolymer is 200,000 to 500,000.

6. The styrene-diene block copolymer as set forth in claim 1, wherein a number average molecular weight of the styrene-diene block copolymer is 250,000 to 400,000.

7. The styrene-diene block copolymer as set forth in claim 1, wherein a number average molecular weight of the polystyrene (PS) is 5,000 to 20,000.

8. The styrene-diene block copolymer as set forth in claim 1, wherein a number average molecular weight of the polystyrene (PS) is 8,000 to 15,000.

9. The styrene-diene block copolymer as set forth in claim 1, wherein a number average molecular weight of the polydiene (PD) is 40,000 to 150,000.

10. The styrene-diene block copolymer as set forth in claim 1, wherein a number average molecular weight of the polydiene (PD) is 50,000 to 130,000.

11. The styrene-diene block copolymer as set forth in claim 1, wherein the content of the polystyrene (PS) is 10 to 30% by weight of the styrene-diene block copolymer.

12. The styrene-diene block copolymer as set forth in claim 1, wherein the content of the polystyrene (PS) is 17 to 25% by weight of the styrene-diene block copolymer.

13. The styrene-diene block copolymer as set forth in claim 1, wherein the coupling efficiency of the active end of the styrene-diene block copolymer is 60 to 95%.

14. The styrene-diene block copolymer as set forth in claim 1, wherein the coupling efficiency of the active end of the styrene-diene block copolymer is 70 to 90%.

15. The styrene-diene block copolymer as set forth in claim 1, wherein the organic solvent that does not react with the organic lithium is one or more selected from the group consisting of linear hydrocarbon compounds such as pentane, hexane, heptane and octane; branched derivatives thereof; cyclic hydrocarbon compounds such as cyclohexane and cycloheptane; aromatic hydrocarbon compounds such as benzene, toluene and xylene; linear or cyclic ether compounds such as dimethyl ether, diethyl ether, anisole and tetrahydrofuran.

* * * * *